United States Patent [19]
Webster et al.

[11] 3,884,580
[45] May 20, 1975

[54] APPARATUS FOR MEASURING AND POSITIONING BY INTERFEROMETRY

[75] Inventors: Ronald B. Webster, Melrose; Kenneth O. Wood, Hebron, both of Conn.

[73] Assignee: The Gerber Scientific Instrument Company, South Windsor, Conn.

[22] Filed: Sept. 7, 1973

[21] Appl. No.: 395,010

[52] U.S. Cl............................................. 356/106 R
[51] Int. Cl. ............................................. G01b 9/02
[58] Field of Search..................... 356/106, 110, 113

[56] References Cited
UNITED STATES PATENTS
| | | | |
|---|---|---|---|
| 3,622,244 | 11/1971 | Chitayat............................ | 356/106 R |
| 3,661,463 | 5/1972 | Brainard et al. ................ | 356/106 R |
| 3,716,845 | 2/1973 | Chaffin ........................... | 356/106 R |

*Primary Examiner*—Ronald L. Wibert
*Assistant Examiner*—Conrad Clark
*Attorney, Agent, or Firm*—McCormick, Paulding & Huber

[57] ABSTRACT

A control system for positioning a movable table relative to a tool head with high accuracy employs laser interferometers for position feedback. Interferometers are mounted on a stationary tool head and cooperate with retroreflectors mounted on the table to measure the displacements of the table relative to the head along two orthogonal measuring axes. Strategic positioning of the interferometers causes the measuring axes to intersect the tool head axis and thereby eliminates certain measurement errors inherent in other systems.

17 Claims, 6 Drawing Figures

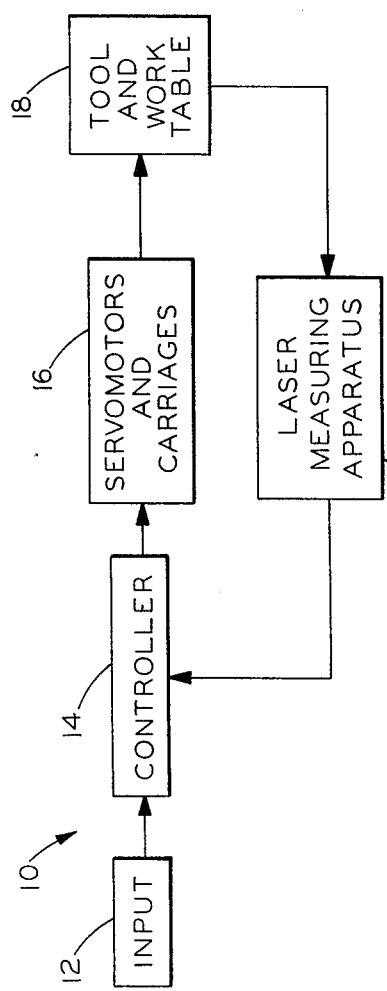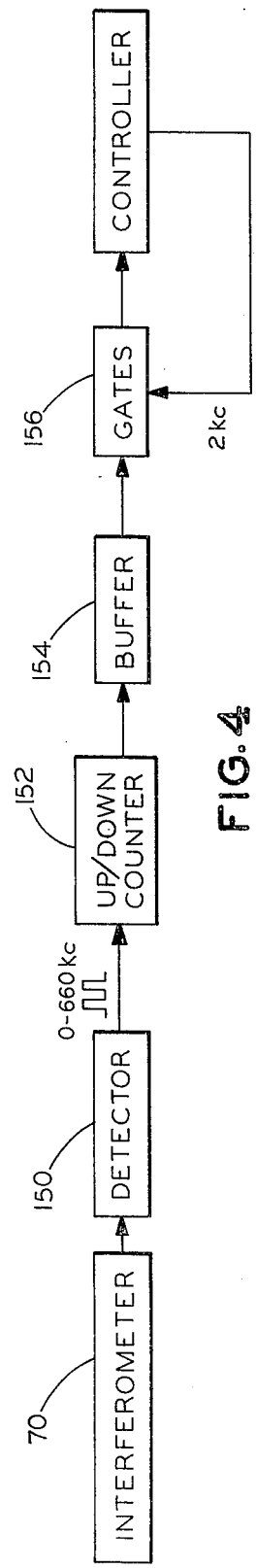

APPARATUS FOR MEASURING AND POSITIONING BY INTERFEROMETRY

BACKGROUND OF THE INVENTION

The present invention relates to high accuracy positioning and measuring systems of the type employed to control the location and translation of a tool relative to a workpiece. More particularly, the present invention relates to tool systems employing laser interferometry to provide position feedback in control systems having servomotors which automatically position a tool and workpiece relative to one another in accordance with a desired work program. Although the invention has utility in a number of tool systems, it is disclosed in particular in a plotting system in which the tool is an optical head used to plot graphic information on a workpiece.

The use of laser interferometry in tool positioning systems is not new in the art. Examples of prior art apparatus employing laser interferometers for position measurement are found in U.S. Pat. Nos. 3,544,213, 3,622,244 and 3,661,464. In many of the prior art systems the interferometers are located on the outer perimeter of a structural frame supporting a movable work table and reflecting mirrors mounted on the edge of the work table facing outwardly of the table cooperate with the interferometers in detecting table motions in two coordinate directions. Of course, the distance measured is determined by the spacing between the interferometers and mirrors, and therefore, the locations of the mirrors and interferometers can be exchanged.

In systems where either the interferometer or the mirror is mounted upon structure which supports the movable table, variations in temperature and stress of the supporting structure result in minute displacements of the measuring component, that is, either the mirror or interferometer, which introduce errors into the overall measuring system. To minimize such errors, the measuring components may be located as close as possible to critical elements with a minimum of structural elements separating them. A laser measuring system utilizing this principle is illustrated in FIG. 3 of U.S. Pat. No. 3,622,244 to Chitayat in which a dual axis interferometer is centrally located above a movable table on which a workpiece is positioned and the measuring axes emanating from the interferometer extend toward inwardly facing reflectors mounted along two edges of the table. The tool which operates upon the workpiece is offset from the interferometer. Primary sources of positional error inherent in such a measuring system become the rotational or azimuthal distortion of the tool support relative to the interferometer and similar table rotations generated by inaccuracies in the drive systems. Such rotational distortions of the tool support or table relative to one another effectively displace the workpoint of the tool on the work table along the circumference of a circle having a radius equal to the offset of the tool and interferometer. Simple calculations indicate that rotational distortions of five arc seconds generate displacement errors on a circle of 3 inch radius in the order of 75 micro-inches. In high accuracy positioning systems seeking positioning errors no greater than 100 micro-inches, the possibility of a 5 arc second rotation is real and, therefore, further refinement in the existing systems is called for.

It is, accordingly, a general object of the present invention to disclose apparatus for measuring and positioning a tool head relative to a work table with high accuracy and to disclose several improvements over the existing art to eliminate or minimize by inherent design the sources of measuring error that affect the prior art systems.

SUMMARY OF THE INVENTION

The present invention resides in an apparatus for measuring the position of a work table relative to a tool head having a known tool axis extending substantially perpendicular to the work surface of the table. The measuring system may be employed to detect relative movements of the tool axis over the work surface so that precise positioning of the tool may be executed with high accuracy. In the context of the present invention the term tool is used in a broad sense and besides mechanical tools it is intended to encompass instruments such as light heads, electron beam generators, microscopes, television cameras and writing instruments such as pens and pencils.

The apparatus employs the principles of laser interferometry and is comprised of a first interferometer mounted on the tool head and having a measuring axis extending at least in part in a first coordinate direction along a first line intersecting the tool axis and parallel to the work surface. A first reflector, such as a plane mirror, is mounted on the work table along the measuring axis and has an effective reflecting plane oriented perpendicular to the first line along which the measuring axis of the interferometer extends. A second interferometer substantially identical to the first is also mounted on the tool head and has a measuring axis extending at least in part in a second coordinate direction along a second line intersecting the tool axis and parallel to the work surface. The first and second lines together with the associated coordinate directions are perpendicular and therefore have an orthogonal relationship with the tool axis. A second reflector, such as a plane mirror, is mounted on the work table along the measuring axis of the second interferometer and has an effective reflecting plane perpendicular to the second line along which the measuring axis from the second interferometer extends. The distances between the interferometers and reflectors vary in length as the table and tool head move relative to one another in the two coordinate directions and the variations in these distances can be readily detected by laser interferometry.

Principal advantages of the present invention are that the interferometers are mounted close to the tool axis and that the measuring axes or the lines along which the axes extend intersect the tool axis. Therefore, rotations of the tool support and work table relative to one another do not result in erroneous measurements of the work point on the work table. Hence, a source of positioning error is eliminated by the inherent structure of the apparatus.

Another feature of the apparatus is found in the locating of the portion of the measuring axis between the tool head and reflector in close proximity to the work table surface. This feature minimizes the effect of Abbe error which is generated by non-parallelism of the measuring axis and the actual plane of interest, that is the work surface of the table, and which is proportional to the separation of the measuring axis and the plane of interest.

BRIEF DESCRIPTION OF THE DRAWINGS

FIG. 1 is a block diagram illustrating generally the servomotor controlled positioning system employing the laser measuring apparatus of the present invention.

FIG. 4 is a block diagram illustrating components for processing the positioning data in the laser measuring apparatus.

DESCRIPTION OF THE PREFERRED EMBODIMENTS

A servomotor controlled positioning system incorporating the present invention and generally designated 10 in FIG. 1 is comprised on an input device 12, such as an on-line computer or a pre-programmed memory disc or tape, which defines desired relative motions of a tool on workpiece mounted on a work table and other control functions associated with the operation performed by the tool on the workpiece. A controller 14 utilizes the information from the input device 12 and converts that information into command signals intelligible to the servomotors and drive carriages illustrated generally at 16 to control the relative movements of the tool and a work table illustrated at 18. Movements of the work table are sensed by the laser measuring apparatus 20 of the present invention and are fed back to the controller 14 to form a closed loop positioning system. Accordingly, the controller 14 operates upon the positioning information derived from the measuring apparatus 20 and makes appropriate corrections in the work table position. The laser measuring apparatus 20 is employed in the control system because of the high resolution positioning data provided.

For purposes of illustration, the laser measuring apparatus described hereinafter is discussed in the context of a plotting system in which the workpiece may be, for example, a photographic plate which is exposed in a predetermined pattern by an optical light head in the plotter. The measuring apparatus, however, is not limited in this respect and can be advantageously employed in other systems where high accuracy positioning data is desired. For example, the positioning of other plotting or marking tools such as pens and scribing tools can be detected and other kinds of tools such as cutting wheels and line followers can also be controlled or tracked. Accordingly the invention has broad application and the term "tool" is used throughout the specification in a broad sense.

Figure 2:
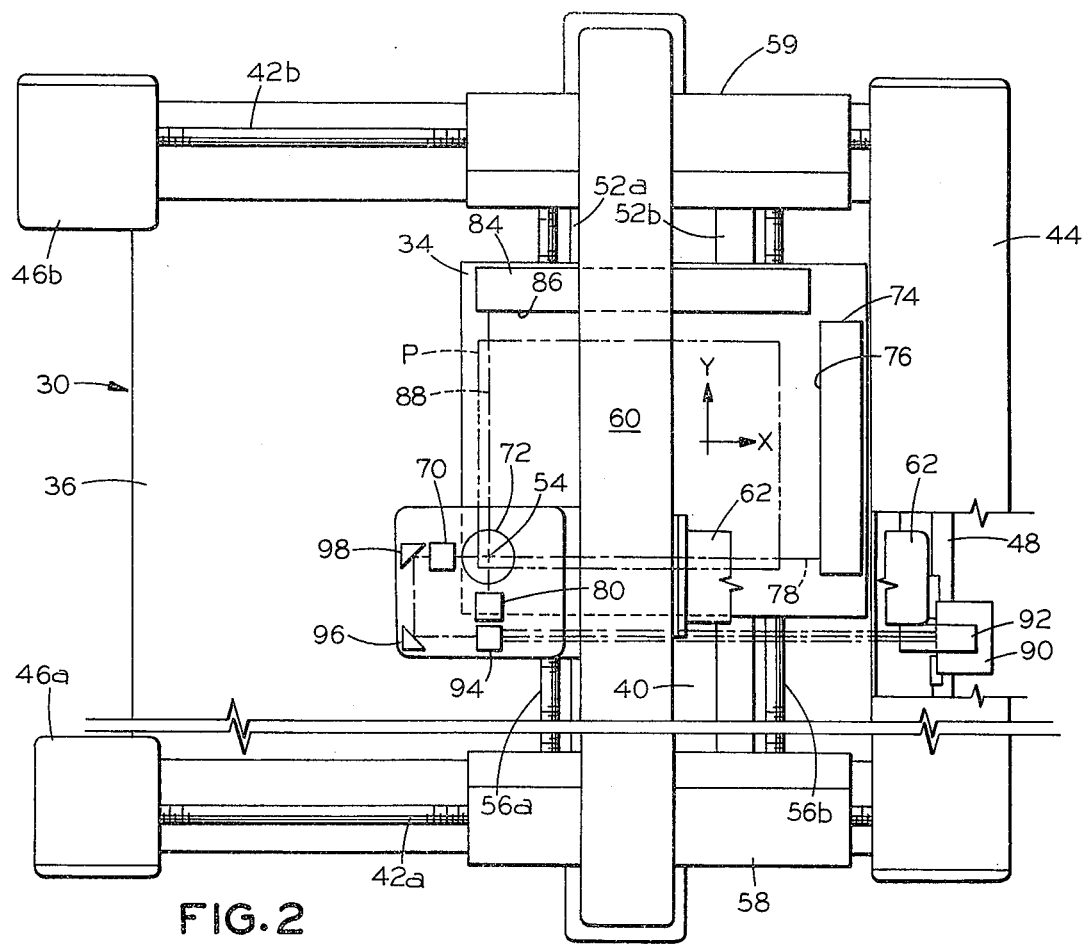
FIG. 2 is a plan view of a plotter employing the laser measuring apparatus of the present invention.
Figure 3:
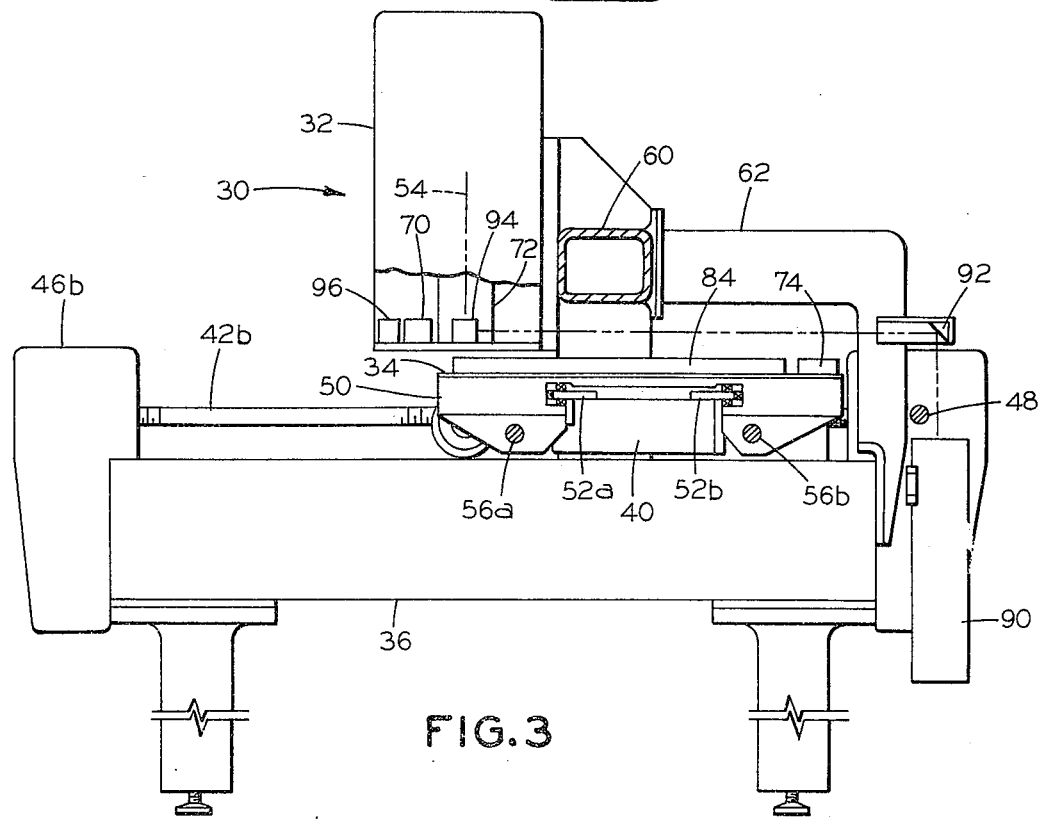
FIG. 3 is a side elevation view of the plotter shown in FIG. 2.

Referring to FIGS. 2 and 3, the plotter, generally designated 30, is illustrated in greater detail. The principal components of the plotter are the plotting head 32 taking the form of an optical exposure or light head and a work table 34 which is moved relative to the plotting head to cause a workpiece in the form of a photographic plate P positioned on the table to be selectively exposed with certain graphic information. Motions of the work table 34 relative to the plotting head 32 in both the X and Y directions illustrated on the table are provided by a system of servomotors and carriages connected between the work table and a support table 36 to which all of the plotting components including the head 32 are attached.

An X-carriage 40 is translated relative to the head 32 and support table 36 in the illustrated X-direction by means of a pair of parallel lead screws 42a and 42b which extend from a drive housing 44 at one side of the table 36 through the carriage 40 to journal bearing housings 46a and 46b respectively at the opposite side of the table 36. A servomotor (not shown) mounted within the housing 44 drives both of the lead screws 42a and 42b in synchronism by means of a cross-drive shaft 48. The two lead screws 42a and 42b are employed at opposite ends of the X-carriage 40 to minimize the lead or lag movements of one end of the carriage relative to the other. Such movements generate slight rotations of the work table 34 and, consequently, could introduce slight positioning errors in data plotted on the plate P. A set of ways (not shown) may also be used to guide the movements of the X-carriage 40 across the table 36.

The Y-carriage 50 seen most clearly in FIG. 3 supports the work table 34 and includes bearings which ride on ways 52a and 52b connected to the X-carriage 40. The Y-carriage 50 translates relative to the X-carriage 40 in the illustrated Y-direction and translates relative to the support table 36 in the X-direction with the X-carriage. Composite motions of the carriages 40 and 50 permit the photographic plate P to be moved under the plotting head 32 in the X-Y plane perpendicular to the optical axis 54 of the head so that any point on the plate P can be intersected by the optical axis.

Motion of the Y-carriage 50 relative to the X-carriage 40 is produced by a pair of lead screws 56a and 56b extending in the Y-direction between housings 58 and 59 on the X-carriage 40 and a servomotor (not shown) mounted within the housing 58 at one end of the X-carriage 40. The lead screws 56a and 56b are driven in synchronism by the servomotor and are employed in a fashion similar to the lead screws 42a and 42b to minimize lead and lag motions of one side of the Y-carriage relative to the other during translations in the illustrated Y-direction.

The servomotors which operate the lead screws 42a, 42b, 56a and 56b receive command signals from the controller 14 illustrated in FIG. 1 and cause the carriages 40 and 50 to produce the composite movements of the work table 34 in the X and Y directions in accordance with a plotting program emanating from the input device 12.

The plotting head 32 is mounted in a stationary fashion to the support table 36 by means of a U-shaped arm 60 bridging the support table 36 in the Y-direction and an L-shaped arm 62 extending from one edge of the table 36 in the X-direction.

Turning more specifically to the laser measuring apparatus of the present invention, a laser interferometer 70 is mounted to the plotting head 32 adjacent the objective lens 72 as illustrated schematically in FIGS. 2 and 3. The interferometer 70 operates with a remote retroreflector 74 mounted on the work table 34 at one edge. The retroreflector 74 may take the form of a plane mirror having a reflecting plane 76 which is perpendicular to a measuring axis 78 extending between the interferometer 70 and the reflector 74 in the illustrated X-direction. The reflector 74 is elongated in the Y-direction so that the reflecting plane 76 is substantially coextensive with the work area on the work table 34 in the Y-direction. The interferometer 70 is mounted on the plotting head 32 so that the measuring axis 78 intersects the optical axis 54 in perpendicular relationship. Also mounted on the plotting head 32 adjacent the objective lens 72 is another laser interferometer 80 which operates with a remote retroreflector 84 mounted on the work table 34 at another edge. The reflector 84 is similar in construction to the reflector 74 and, therefore, takes the form of a plane mirror having a reflecting plane 86 which is arranged in perpendicular relationship to the measuring axis 88 of the interferometer 80. The reflector 84 extends over the work table 34 in the X-direction a distance coextensive with the dimension of the work surface on the table 34. The measuring axis 88 also intersects the optical axis 54 of the plotting head in perpendicular relationship so that the three axes 54, 78 and 88 are in orthogonal relationship.

It will thus be understood from the above that the laser measuring system detects relative movement between the interferometer 70 and reflector 74, or the X-axis position of the work table 34 relative to the plotting head 32 and the relative movement between interferometer 80 and reflector 84, or the Y-axis position of the work table 34 relative to the plotting head 32. The starting or reference position of the head 32 and table 34 can be established by suitable mechanical or optical means.

The term "measuring axis" as used in this specification refers to the axis along which an interferometer projects a beam or beams of coherent light to a remote reflector for the purpose of measuring relative movement between the interferometer and the reflector. The axis may in fact be the median line between two or more parallel beams of light and the beams may be deflected at points between the interferometer and reflector so that the measuring axis may be bent with one portion extending in one direction and another portion in another direction. The term "intersecting" is intended to refer to the geometric condition in which a line or an extension of the line passes through a specific point, line or plane.

Cooperating with the interferometers 70 and 80 is a helium-neon laser and detector device 90 mounted on the support table 36 at one side. The device 90 performs the function of generating an outgoing laser beam and also includes detectors for sensing the fringe patterns observed in incoming laser beams for the measurement of position information.

The outgoing laser beam emitted by the device 90 is deflected at a turning mirror 92 on the arm 62 to a beam splitter 94 mounted on the plotting head 32 adjacent the interferometer 80. The beam splitter directs one portion of the laser beam to the interferometer 80 and another portion to the interferometer 70 by means of two turning mirrors 96 and 98. The beam splitter 94, the two turning mirrors 96 and 98 and the lens 72 are located at the spaced corners of a rectangle. The interferometers 70 and 80 direct the laser beams to the reflectors 74 and 84 respectively and return the reflected beams to separate detectors in the device 90 where the X and Y position information is developed for the feedback signal applied to the controller 14 of FIG. 1.

A laser and detector device which may be utilized in the present invention for two-axis measurements is manufactured by Hewlett Packard as Model 5526A laser measurement system. The generation and detection of laser beam fringe patterns to determine relative movement or position is well known in the art. The reflected laser beams develop fringe patterns representing the relative movements of the work table 34 and plotting head 32, and the detected fringe patterns are converted to high accuracy data signals for use in the feedback circuits of the servomotor controller 14 in FIG. 1.

One system for handling the data signals generated by the fringe patterns associated with relative movements in the X-coordinate direction is illustrated in block diagram form in FIG. 4. The system for handling the Y-coordinate data would be the same and hence is not described.

The interferometer 70 returns the reflected laser beam to a detector 150 which converts the fringe patterns from an optical signal to a series of electrical pulses, one pulse for each detected fringe. Each fringe pattern may, for example, represent relative movement of three microinches and if the maxium speed of movement of the work table 34 in the X-direction is two inches per second, the data pulses produced by the detector 150 will range from zero when there is no table movement to 660 kc at maximum table speed. The data pulses are recorded in an up/down fringe counter 152 which at any point in time holds a cumulative count representative of the absolute position of the work table along the X-axis.

Since the maxium rate at which pulses may be produced by the detector 150 is relatively high, it is necessary either that the controller possess high frequency circuitry to handle the data at the rate or that the data acquisition rate of the controller 14 be reduced. High frequency circuitry can be employed but it is preferably to employ low frequency circuitry in the controller.

To this end the fringe pattern data is transferred to a buffer 154 and data is then taken from the buffer through clock-controlled gates 156 by the controller 14 at a sampling rate substantially less than the maximum frequency of the fringe pulses. For example, a 2 kc timing signal from a clock in the controller 14 actuates the gates 156 to periodically update the positioning data in the controller. Since the table generally moves at a much slower rate than its maximum when the command signals applied to the servomotors are changing significantly and fine data resolution is important, the reduced sampling rate established by the controller does not greatly affect the overall accuracy of the plotted data.

Figure 5:
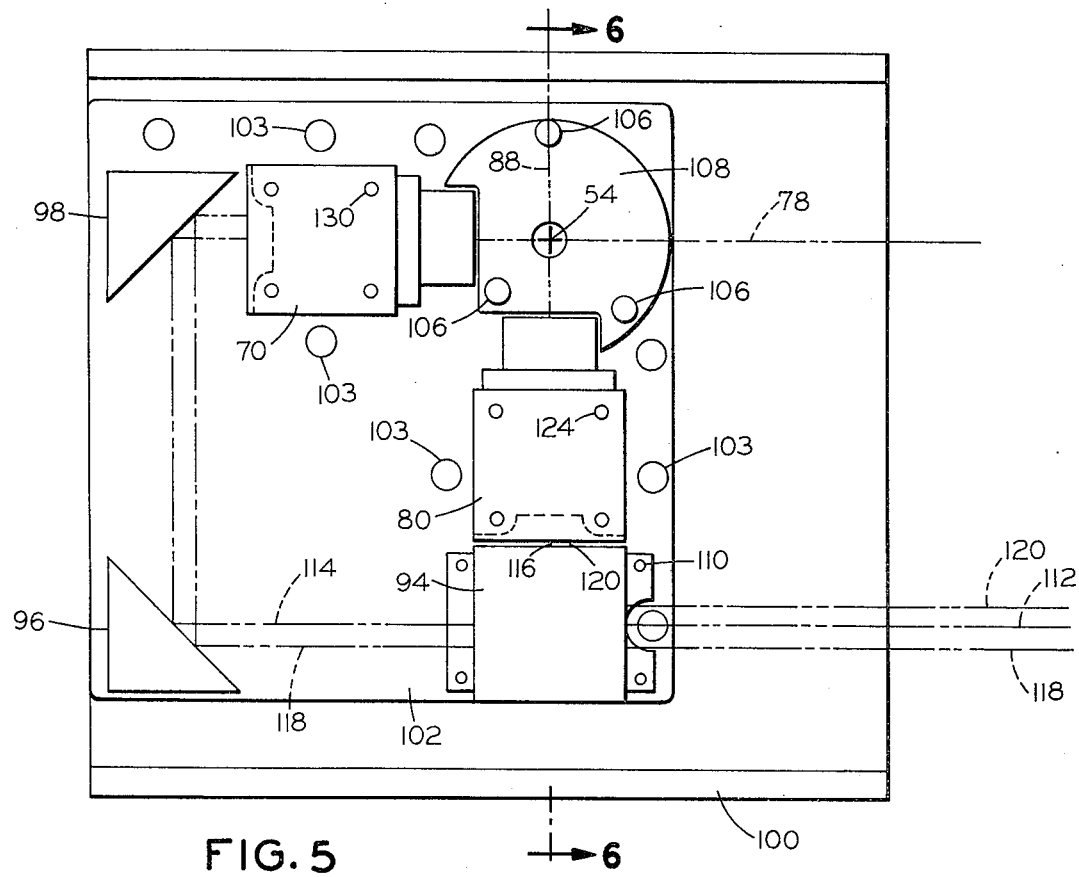
FIG. 5 is a fragmentary plan view illustrating the location of the laser interferometers about the plotting head axis.
Figure 6:
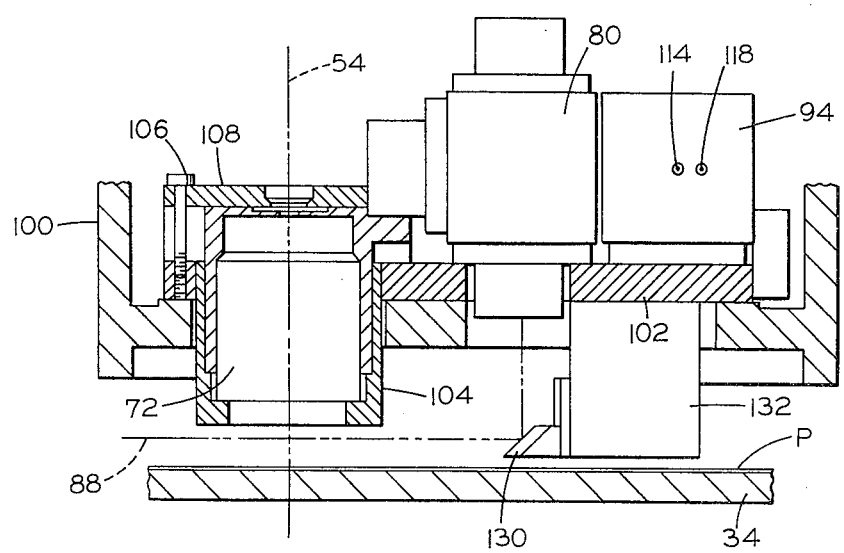
FIG. 6 is a fragmentary sectional view of the plotting head as viewed along the sectioning line 6—6 in FIG. 5.

FIGS. 5 and 6 illustrate the precise mounting of the optical components including the interferometers 70 and 80 on the frame of the plotting head 32 adjacent the objective lens 72. The lower end of the plotting head frame 100 is spaced slightly above the surface of the work table 34. All of the optical components including the interferometers 70 and 80, the objective lens 72, the beam splitter 94 and the two turning mirrors 96 and 98 are positioned on a common mounting plate 102 secured to the frame 100 by cap screws 103. The mounting plate 102 is preferably made of Invar, a metal having a very low coefficient thermal expansion, so that thermal changes do not affect the relative positioning of the optical components.

The objective lens 72 is supported in an aluminum sleeve 104 in the plate 102 and is held in position by means of a set of cap screws 106 and a clamping plate 108.

The beam splitter 94 is mounted at the edge of the plate 102 by means of four cap screws 110 and is positioned on the mounting plate 102 and the frame 100 so that an incoming beam 112 is received and split into two beams 114 and 116 which are sent respectively to the interferometer 70 by means of the turning mirrors 96 and 98 and to the interferometer 80 directly. A reflected beam 118 from the interferometer 70 is returned through the beam splitter 94 to a detector, such as the detector 150 in FIG. 4, in the device 90 where the fringe patterns are developed into X-axis position information. Correspondingly, a reflected beam 120 from the interferometer 80 also passes through the beam splitter 94 and is returned to another detector in the device 90 for development of Y-axis position information.

Interferometer 80 is mounted by four cap screws 24 adjacent the objective lens 72 of the plotting head at a side of the optical axis 54 diametrically opposite the retroreflector 84 (FIG. 2) with which the interferometer 80 cooperates.

To eliminate error caused by rotation of the interferometers and the lens 72, it is important that the measuring axis 88 intersect the optical axis 54. It is also preferable that the principal portions of the measuring axis extend as close as possible to the work surface of the table 34 to minimize the effect of Abbe error. Without explaining Abbe error in detail it will be sufficient to understand that such error arises by virtue of the angular relationship of the workpiece plane relative to the axis along which motion of the workpiece is measured and the error is proportional to the separation of the measuring axis and the workpiece plane.

To this end, the interferometer 80 is mounted as shown in FIG. 6 with the adjacent portion of the measuring axis 88 extending downwardly to a 45° mirror 130 suspended directly below the interferometer by a mounting block 132 fastened to the mounting plate 102. The axis 88 or more correctly the incident and reflected laser beam or beams passing to and from the interferometer 80 and defining the axis 88, are deflected 90° by the mirror in the Y-coordinate direction parallel to the work surface of the table 34 and the photographic plate P. The mirror 130 is suspended in closely spaced relationship to the work surface of the table 34 so that the measuring axis 88 is as close as possible to the work surface and Abbe error effects are minimized.

Although the one portion of the measuring axis 88 projecting downwardly onto the mirror 130 from the interferometer 80 and then to the optical axis 54 is in the sensitive region between the retroreflector 84 and the interferometer 80 and, theoretically is associated with the detected motion, the close mounting of the interferometer 80, the lens 72 and the mirror 130 on the mounting plate 102 substantially eliminates relative motions in this region.

The motion detected therefore, is the Y-axis movement of the table 34 relative to the optical axis 54 of the plotting head 32.

The interferometer 70 is mounted by four cap screws 130 in FIG. 5 adjacent the objective lens 72 at a station 90° about the optical axis 54 from the interferometer 80. Like the interferometer 80, the interferometer 70 is positioned at the side of the optical axis 54 diametrically opposite the retroreflector 74 on the table 34. Although not illustrated, a 45° mirror similar to mirror 130 is mounted from the plate 102 below the interferometer 70 close to the work table 34 for deflecting the incident and reflected laser beams between the interferometer 70 and the retroreflector 74. Accordingly, the motion detected through the interferometer 70 is the X-axis movement of the table 34 relative to the optical axis 54 of the plotting head 32.

It will thus be seen that the interferometers are mounted to the plotting head whose position is critically important relative to the work table 34 on which the photographic plate is carried. The retroreflectors 74 and 84 are mounted as close as possible to the area on which the plotting program is generated. Thus both of the measuring components are located as close as possible to the critical points of interest and linear contractions or expansions of the support table 36 or the arms 60 and 62 supporting the plotting head 32 do not interfere with the accuracy of the plotted information. Effectively, the retroreflectors and interferometers establish optical ways along which the motions of the work table are measured. Distortions in the mechanical ways do not introduce positioning error. Furthermore, by causing the measuring axes 78 and 88 to intersect the optical axis 54, mechanical or thermal strains causing rotation of the plotting head and the interferometers do not change the point of reference of the interferometers relative to the optical axis. In other prior art systems where the interferometers are located at the periphery of the support table 36 and are directed inwardly toward retroreflectors on the work table, the positioning of the optical axis or other tool axis and the interferometers is subject to all of the straining and thermal expansion associated with the intervening structure. The measuring apparatus of the present invention inherently eliminates this large source of error in the positioning information.

While the present invention has been described in a preferred embodiment, it should be understood that various modifications and substitutions can be had in the disclosed structure without departing from the spirit of the invention. For example, the retroreflectors 74 and 84 need not be plane mirrors but instead may take the form of roof prisms having reflecting planes perpendicular to the table 34. Although the tool employed in the disclosed plotter 30 is effectively a transparent light beam and does not impede the laser beam at the intersection of the optical axis 54 and measuring axes 78 and 88, it is posssible to employ opaque tools such as pens and cutting tools by utilizing known interferometers which produce two spaced and parallel laser beams so that the beams effectively straddle the tool but the measuring axis intersects the axis of the tool. Hence, the present invention is not limited to systems having transparent tools. It should also be noted that the remote mounting of the laser and detector device 90 does not effect the measurement of table position even in the presence of distortions in the structure between the device 90 and the plotting head 32 because such distortions are compensated for by the laser detector and processor where a laser producing two slightly different optical frequencies of opposite circular polarization is used with a polarization beam splitter in the interferometers. Such beam splitter diverts one frequency directly back to the detector and utilizes the second frequency to make the position measurement. The present invention can also be carried out in an alternate construction in which the interferometers are located adjacent the objective lens 72 but on the same side of the optical axis 54 as the cooperating retroreflectors. In such contruction, the major portions of the measuring axes extending parallel to the work surface of the table 34 would extend along a line which when projected would intersect the optical axes with the desirable results mentioned above. The positioning of the interferometers at the opposite side of the optical axis is preferred because it permits plotting in regions of the work table immediately adjacent the retroreflectors without encountering interference between the reflectors and interferometers. The use of two lead screws at opposite sides of the carriages 40 and 50 to control the carriage motions is not essential provided that adequate mechanical ways prevent rotation of the carriages about axes perpendicular to the work surface when the table is translated. Accordingly, the present invention has been described in a preferred embodiment by way of illustration rather than limitation.

We claim:

1. Apparatus for measuring the position of a work table relative to a tool head having a tool axis extending substantially perpendicular to the work surface of the table comprising:
    a first interferometer mounted on the head in the vicinity of the tool axis and having a measuring axis extending at least in part parallel to the work surface in a first coordinate direction along a first line intersecting the tool axis;
    a first reflector mounted on the work table and having a reflecting surface extending adjacent the work surface perpendicular to the first line and facing inwardly of the table toward the tool head;
    a second interferometer also mounted on the tool head in the vicinity of the tool axis and having a measuring axis extending at least in part parallel to the work surface in a second coordinate direction along a second line intersecting the tool axis and perpendicular to the first line; and
    a second reflector mounted on the work table and having a reflecting surface extending adjacent the work surface perpendicular to the second line and facing inwardly of the table toward the tool head.

2. Apparatus for measuring the position of a work table as defined in claim 1 wherein:
    the first interferometer is mounted on the tool head at a position about the tool axis directly opposite the first reflector mounted on the table.

3. Apparatus for measuring as defined in claim 2 wherein the first interferometer has said part of the measuring axis in the first coordinate direction extending between the tool head and the first reflector in close proximity to the work surface.

4. Apparatus for measuring as defined in claim 2 wherein:
    the first interferometer is mounted with a first portion of the measuring axis projecting from the interferometer toward the work surface; and
    an optical reflector is suspended below the interferometer to establish a second portion of the measuring axis extending in the first coordinate direction.

5. Apparatus for measuring as defined in claim 4 wherein:
    the optical reflector is suspended in close proximity to the work surface of the table.

6. Apparatus for measuring as defined in claim 4 wherein the optical reflector and the first interferometer are attached to a common mounting plate.

7. Apparatus for measuring the position of a work table as defined in claim 1 further including a laser for producing a laser beam; and means for directing the laser beam to the first and second interferometers.

8. Apparatus for measuring as defined in claim 7 wherein:
    the first and second interferometers are located 90° from each other about the tool axis; and
    the means for directing comprises a beam splitter having beam axes associated with the respective interferometers.

9. Apparatus as defined in claim 8 wherein the means for directing also includes two turning mirrors cooperating with the beam splitter to enable beams to reach the respective interferometers.

10. Apparatus as defined in claim 9 wherein the two turning mirrors, the beam splitter and the tool axis are spacially located at the corner of a rectangle.

11. A high accuracy positioning system for a work table defining a work surface movable in first and second coordinate directions relative to a tool head having a tool axis extending orthogonally of the two coordinate directions comprising:
    drive means including motor driven carriages for moving the work table in the first and second coordinate directions relative to the head;
    a first interferometer mounted to the tool head and having at least a portion of a measuring axis extending from the head in a direction intersecting the tool axis and parallel to the first coordinate direction;
    a first retroreflector mounted on the work table and intersecting said portion of the measuring axis of the first interferometer whereby the measuring axis extends from the head to the first retroreflector over the table;
    a second interferometer mounted to the tool head and having at least a portion of another measuring axis extending from the head in another direction intersecting the tool axis and parallel to the second coordinate direction;
    a second retroreflector mounted on the work table and intersecting said portion of the measuring axis of the second interferometer whereby the measuring axis extends from the head to the second retroreflector over the table;
    and control means connected with the interferometers and connected to the drive means for regulating the drive means in response to positional information detected through the interferometers along the respective measuring axes.

12. A high accuracy positioning system as defined in claim 11 wherein:
    the first retroreflector extends along the table in the second coordinate direction a distance coextensive with the work surface in the second coordinate direction.

13. A high accuracy positioning system as defined in claim 12 wherein:
    the first retroreflector comprises a plane mirror reflector.

14. A high accuracy positioning system as in claim 11 wherein:
the first and second interferometers are mounted at sides of the tool head opposite the first and second retroreflectors respectively.

15. A high accuracy positioning system as in claim 14 wherein a common mounting plate is provided for the first and second interferometers on the tool head.

16. A high accuracy positioning system as in claim 11 wherein:
the first interferometer is mounted to the tool head adjacent the tool axis with a first portion of the measuring axis projecting from the first interferometer toward the work surface of the work table; and an optical reflector is suspended between the first interferometer and the work surface on the measuring axis to define a second portion of the measuring axis parallel to the first coordinate direction between the tool head and the first retroreflector.

17. A high accuracy positioning system as in claim 16 wherein:
the optical reflector is suspended between the first interferometer and the work surface of the table in close proximity to the work surface.

* * * * *